US010836013B2

(12) United States Patent
Moriyama et al.

(10) Patent No.: US 10,836,013 B2
(45) Date of Patent: Nov. 17, 2020

(54) VERTICAL MOTION IMPELLER-TYPE SHOT PEENING DEVICE AND COIL SPRING

(71) Applicant: NHK SPRING CO., LTD., Yokohama (JP)

(72) Inventors: Senri Moriyama, Yokohama (JP); Satoshi Akiyama, Fujisawa (JP); Masaya Komazaki, Yokohama (JP); Go Nagayasu, Yokohama (JP); Hideki Okada, Yokohama (JP); Daisuke Yokota, Yokosuka (JP)

(73) Assignee: NHK SPRING CO., LTD., Kanagawa (JP)

( * ) Notice: Subject to any disclaimer, the term of this patent is extended or adjusted under 35 U.S.C. 154(b) by 47 days.

(21) Appl. No.: 16/383,231

(22) Filed: Apr. 12, 2019

(65) Prior Publication Data
US 2019/0232462 A1 Aug. 1, 2019

Related U.S. Application Data

(60) Division of application No. 15/434,519, filed on Feb. 16, 2017, now Pat. No. 10,315,287, which is a
(Continued)

(30) Foreign Application Priority Data

Aug. 20, 2014 (JP) ................... 2014-167758

(51) Int. Cl.
*F16F 1/04* (2006.01)
*B24C 1/10* (2006.01)
(Continued)

(52) U.S. Cl.
CPC ................. *B24C 1/10* (2013.01); *B24C 3/24* (2013.01); *F16F 1/02* (2013.01); *F16F 1/04* (2013.01)

(58) Field of Classification Search
CPC ...... B60G 21/055; B60G 11/14; B60G 11/16; F16F 1/02; F16F 1/04; C21D 9/02; C21D 7/06; B24C 3/24; B24C 1/10
(Continued)

(56) References Cited

U.S. PATENT DOCUMENTS 3,103,767 A 9/1963 Greenberg et al.
3,604,157 A 9/1971 Fogle
(Continued)

FOREIGN PATENT DOCUMENTS

DE 4408643 C1 6/1995
JP 05031671 A 2/1993
(Continued)

OTHER PUBLICATIONS

Extended European Search Report (EESR) dated Mar. 16, 2018 issued in European Application No. 15834152.9.
(Continued)

*Primary Examiner* — Christopher P Schwartz
(74) *Attorney, Agent, or Firm* — Holtz, Holtz & Volek PC

(57) ABSTRACT

A coil spring includes a helically formed wire having end turn portions at ends thereof, a plurality of first rough surfaces, each including first shot peening indentations formed on a part of a surface of the end turn portions, and a second rough surface including second shot peening indentations formed on the entire surface of the wire except for the first rough surface. The second rough surface has a surface roughness different from that of the first rough surface.

5 Claims, 7 Drawing Sheets

Related U.S. Application Data continuation of application No. PCT/JP2015/066609, filed on Jun. 9, 2015.

(51) Int. Cl.
*B24C 3/24* (2006.01)
*F16F 1/02* (2006.01)

(58) Field of Classification Search
USPC ....... 29/90.7, 896.9–896.93; 72/53; 148/580, 148/908; 267/166, 166.1, 167–180
See application file for complete search history.

(56) References Cited

U.S. PATENT DOCUMENTS

| | | | |
|---|---|---|---|
| 3,731,432 | A | 5/1973 | Carpenter et al. |
| 5,823,034 | A | 10/1998 | Nelepovitz |
| 5,879,223 | A | 3/1999 | Frederick et al. |
| 6,346,157 | B1 * | 2/2002 | Takezawa ................ C21D 7/06 148/580 |
| 6,544,360 | B1 | 4/2003 | Tange et al. |
| 7,140,216 | B2 | 11/2006 | Garza |
| 8,533,954 | B2 * | 9/2013 | Tange ...................... C21D 9/02 29/896.9 |
| 8,607,605 | B2 * | 12/2013 | Tange ...................... B21F 99/00 72/53 |
| 9,073,176 | B2 * | 7/2015 | Kobayashi ................ B24C 1/08 |
| 9,752,636 | B2 | 9/2017 | Ono et al. |
| 9,776,301 | B2 | 10/2017 | Yamamoto |
| 10,214,798 | B2 * | 2/2019 | Schuh ........................ C22C 9/04 |
| 10,583,706 | B2 * | 3/2020 | Tange ...................... C21D 7/06 |
| 2008/0258367 | A1 * | 10/2008 | Dixon ..................... B24C 3/085 267/286 |
| 2012/0055216 | A1 | 3/2012 | Tange et al. |
| 2014/0360241 | A1 | 12/2014 | Yamamoto |
| 2015/0252863 | A1 | 9/2015 | Ono et al. |
| 2017/0157744 | A1 * | 6/2017 | Moriyama ................ F16F 1/04 |

FOREIGN PATENT DOCUMENTS

| | | |
|---|---|---|
| JP | 07314333 A | 12/1995 |
| JP | 2000345238 A | 12/2000 |
| JP | 2002361558 A | 12/2002 |
| JP | 2003117830 A | 4/2003 |
| JP | 2011000664 A | 1/2011 |
| JP | 5393281 B2 | 1/2014 |
| KR | 100931155 B1 | 12/2009 |
| WO | 0075381 A1 | 12/2000 |
| WO | 2013005763 A1 | 1/2013 |
| WO | 2013011736 A1 | 1/2013 |
| WO | 2013121632 A1 | 8/2013 |
| WO | 2014042066 A1 | 3/2014 |

OTHER PUBLICATIONS

International Search Report (ISR) and Written Opinion dated Sep. 8, 2015 issued in International Application No. PCT/JP2015/066609.

Japanese Office Action dated Oct. 16, 2018 (and English translation thereof) issued in counterpart Japanese Application No. 2018-012810.

Indian Office Action dated Aug. 9, 2019 issued in Indian Application No. 201717009451.

* cited by examiner

VERTICAL MOTION IMPELLER-TYPE SHOT PEENING DEVICE AND COIL SPRING

CROSS REFERENCE TO RELATED APPLICATIONS

This application is a Divisional application of U.S. application Ser. No. 15/434,519, filed Feb. 16, 2017, which is a Continuation Application of PCT Application No. PCT/JP2015/066609, filed Jun. 9, 2015 and based upon and claiming the benefit of priority from prior Japanese Patent Application No. 2014-167758, filed Aug. 20, 2014. The entire contents of all the above-identified applications are incorporated herein by reference.

BACKGROUND OF THE INVENTION

1. Field of the Invention

Present invention described herein relates to a vertical motion impeller-type shot peening device for performing shot peening to a coil spring and a coil spring subjected to shot peening.

2. Description of the Related Art

Coil springs are used as, for example, suspension springs of a suspension device of a vehicle. To increase durability of such a coil spring, there is a known technique to impart a compressive residual stress to the proximity of the surface of the coil spring by shot peening. Patent Literature 1 (JP2002-361558A) discloses an example of conventional shot peening devices. A shot peening device projects shots to the coil spring from a centrifugal accelerator (impeller) as the coil spring continuously conveyed. Furthermore, as disclosed in Patent Literature 2 (JP2003-117830A), a shot peening method which produces greater compressive residual stress by stress peening is also known. In the stress peening technique, a coil spring is compressed and shot peening is performed while a stress is applied thereto.

In the continuous shot peening device disclosed in Patent Literature 1 (JP2002-361558A), a coil spring is continuously conveyed in a single direction and shots are projected from a single direction. In such a continuous shot peening device, some improvement is required to produce a greater compressive residual stress on the entire surface of the coil spring. In the stress peening disclosed in Patent Literature 2 (JP2003-117830A), shot peening is performed while the coil spring is compressed; however, in such a compressed spring coil in the stress peening process, gaps between adjacent pairs of turn portions of a wire become narrower than are in a coil spring in a free state. That is, shots projected from a predetermined direction do not easily enter the gaps between adjacent pairs of turn portions of the wire. Shots hit the outer surface side of the coil spring while the inner surface side of the coil spring is partly shadowed by the wire. In the shadows, shots do not hit sufficiently, and the compressive residual stress becomes insufficient and desired durability cannot be achieved.

BRIEF SUMMARY OF THE INVENTION

Accordingly, an object of the present invention is to provide a vertical motion impeller-type shot peening device which can produce a compressive residual stress effective to improve durability of the coil spring and a coil spring subjected to shot peening of the device.

According to one embodiment, a vertical motion impeller-type shot peening device includes a housing in which a coil spring as a workpiece is accommodated, workpiece holding mechanism, stress applying mechanism, rotation mechanism, projection mechanism, and elevator mechanism. The housing includes a first chamber with a workpiece port through which the coil spring is put in and put out and a second chamber which performs shot peening to the coil spring. The workpiece holding mechanism includes a lower end turn support contacting a lower end turn portion of the coil spring and an upper end turn support contacting an upper end turn portion of the coil spring. The workpiece holding mechanism which holds the coil spring standing between the lower end turn support and the upper end turn support.

The stress applying mechanism compresses the coil spring conveyed into the second chamber between the lower end turn support and the upper end turn support. The rotation mechanism rotates the coil spring in the second chamber around its vertical axis. The projection mechanism projects shots toward the coil spring while the coil spring in the second chamber is compressed by the stress applying mechanism and rotated by the rotation mechanism. The elevator mechanism moves the projection mechanism vertically while the shots are projected to the coil spring.

With the vertical motion impeller-type shot peening device of the present invention, a compressive residual stress which is effective for the improvement of the durability can be produced on the coil spring. The first rough surface including first shot peening indentations remains in an island shape on the parts of the end turn portion where the end turn supports contact thereto. However, the first rough surface is formed in the end turn portion which can hold much stress, and thus, there is no disadvantage in the durability even if the first rough surface is created. Whether or not there has been two-shot peening including first shot peening and second shot peening can be checked visually by checking if there is a first rough surface before coating the coil spring.

The workpiece holding mechanism may include a turntable and a revolution mechanism. In the turntable, the lower end turn support is disposed. The revolution mechanism rotates the turntable around the revolution axis such that the lower end turn support reciprocates between the first chamber and the second chamber. Furthermore, the workpiece holding mechanism may include a pair of the lower end turn supports. The lower end turn supports may be arranged on the turntable 180° symmetrically with respect to the revolution axis, and the turntable may be rotated 180° at a time by the revolution mechanism.

Furthermore, the projection mechanism may include a first impeller unit and a second impeller unit. The first impeller unit projects shots from a diagonally upward position of the coil spring in the second chamber and moves vertically with respect to the coil spring. The second impeller unit projects shots from a diagonally downward position of the coil spring and moves vertically with respect to the coil spring.

Furthermore, the housing may include a first hinge mechanism and a second hinge mechanism. The first hinge mechanism rotatably supports the first impeller unit in either an open position or a close position with respect to the second chamber. The second hinge mechanism rotatably supports the second impeller unit in either an open position or a close position with respect to the second chamber.

According to an embodiment, a coil spring comprises a helically formed wire and has end turn portions at its ends.

The coil spring includes a first rough surface formed on a part of the surface of the end turn portions, and a second rough surface formed on the entire surface of the wire except for the first rough surface. The first rough surface includes first shot peening indentations. The second rough surface includes second shot peening indentations of which surface roughness is different from that of the first rough surface. For example, the first rough surface is scattered in a plurality of locations in an island shape on the end turn portion at intervals in the winding direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A coil spring and a vertical motion impeller-type shot peening device of an embodiment will be explained hereinafter with reference to FIGS. 1 to 10.

Figure 1:
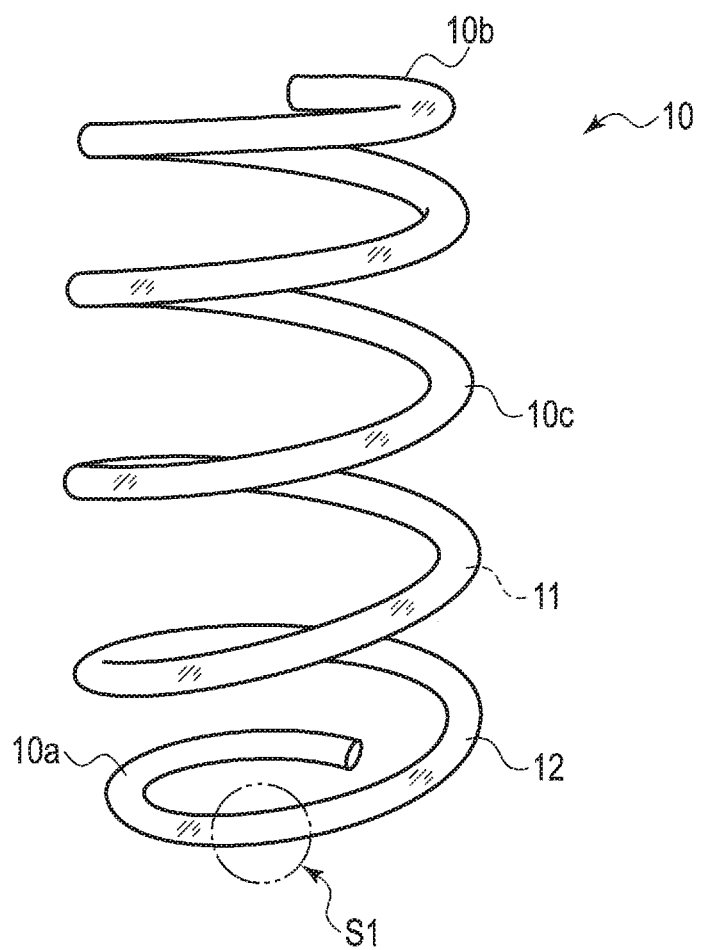
FIG. 1 is a perspective view of a coil spring of an embodiment.
Figure 2:
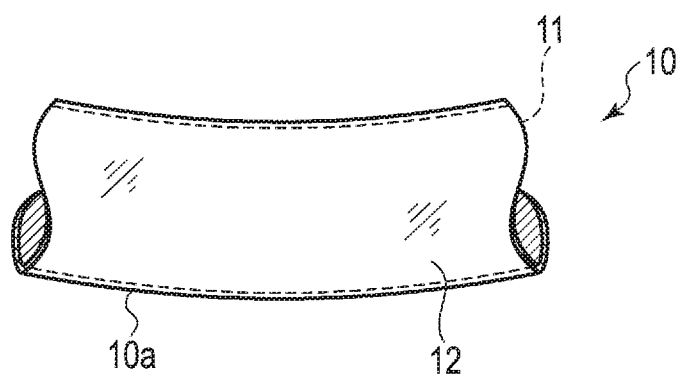
FIG. 2 shows a part of the coil spring of FIG. 1 in an enlarged manner.

FIG. 1 shows an example of a coil spring 10 which is coated. FIG. 2 shows a part of the coated coil spring 10 (S1 in FIG. 1) in an enlarged manner. The coil spring 10 includes element wire (wire) 11 formed helically. The surface of the wire 11 is covered with a rust-proof coating (paint coat) 12. End turn portions 10a and 10b are formed at the ends of the coil spring 10. A helically-shaped effective portion 10c is formed between the end turn portions 10a and 10b to deform corresponding to a compressive load applied thereto.

In FIG. 1, the lower end turn portion 10a is less than one turn (for example, 0.6 turn) from the lower end of the wire 11. In, for example, a vehicle suspension device, the lower end turn portion 10a contacts a lower spring seat. In FIG. 1, the upper end turn portion 10b is less than one turn (for example, 0.6 turn) from the upper end of the wire 11. In, for example, a vehicle suspension device, the upper end turn portion 10b contacts an upper spring seat. A torsional stress is produced on the wire 11 when the effective portion 10c is deformed by a compressive load applied on the coil spring 10.

In the example, the coil spring 10 is formed as a cylindrical coil spring. However, the coil spring may be changed in various types such as barrel-type coil spring, hourglass-type coil spring, tapered coil spring, irregularly-pitched coil spring to conform to types of the suspension device. The wire 11 is formed of a spring steel of which cross-section is a circle. In a coil spring for a suspension of an automobile, the wire 11 generally has a diameter of 8 to 21 mm; however, the diameter thereof is, of course, optional.

The spring steel used for the wire 11 is not limited to a specific kind, and there is SAE9254 which complies US "Society of Automotive Engineers", for example. Chemical compositions (mass %) of SAE9254 are C: 0.51 to 0.59, Si: 1.20 to 1.60, Mn: 0.60 to 0.80, Cr: 0.60 to 0.80, S: 0.040 at maximum, P: 0.030 at maximum, Fe: remaining. The steel may be a super high strength spring steel.

Figure 3:
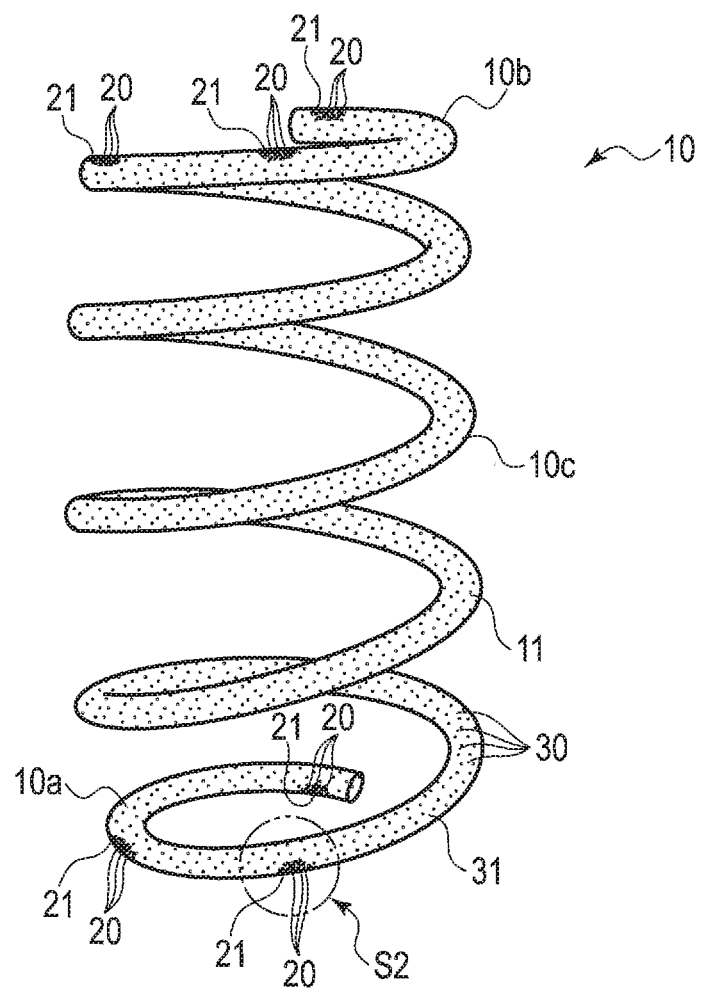
FIG. 3 is a perspective view of the coil spring before coating.
Figure 4:
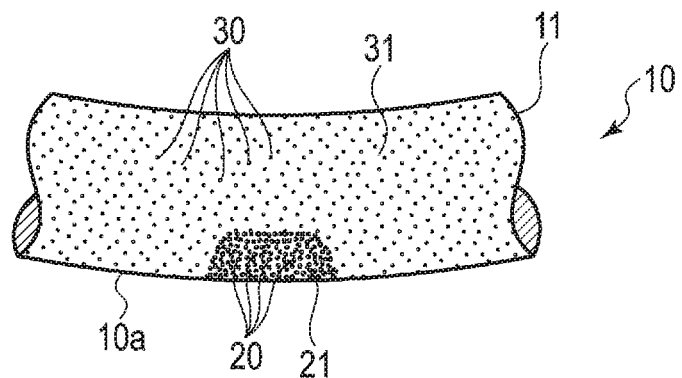
FIG. 4 shows a part of the before-coating coil spring of FIG. 3 in an enlarged manner.

FIG. 3 shows the coil spring 10 before coating (formation of a coating film). FIG. 4 shows a part of the coil spring 10 before coating (S2 in FIG. 3) in an enlarged manner. As in FIGS. 3 and 4, on a part of the end turn portions 10a and 10b before coating, a first rough surface 21 is formed (schematically shown in thicker dots in FIGS. 3 and 4). The first rough surface 21 includes first shot peening indentations 20. The first shot peening indentations 20 include a large number of microscopic asperities.

There are several (three or four) first rough surfaces 21 on the lower end turn portion 10a and the upper end turn portion 10b. The first rough surfaces 21 are scattered in an island shape at intervals on the end turn portions 10a and 10b in the winding direction thereof. The first shot peening indentations 20 are formed on the entire surface of the wire 11 in a first shot peening process explained hereinafter. In the first shot peening process, first shots SH1 are projected to a coil spring 12 by, for example, a continuous shot peening device 40 (shown in FIG. 6). A second rough surface 31 (schematically shown in FIGS. 3 and 4 in thinner dots) is formed on the surface of the wire 11 except for the part where the first rough surface 21 is formed. The second rough surface 31 includes second shot peening indentations 30. The second shot peening indentations 30 include a large number of microscopic asperities.

The second shot peening indentations 30 are formed on the entire surface of the wire 11 except for the first rough surface 21 by a vertical motion impeller-type shot peening device 50. The vertical motion impeller-type shot peening device 50 will be explained later. The surface roughness of the second rough surface 31 is different from that of the first rough surface 21. The surface roughness differs depending on the conditions of shot peening. The roughness of the second rough surface 31 is less than that of the first rough surface 21. For example, the first rough surface 21 has its maximum height of 30 to 50 μm while the second rough surface 31 has its maximum height of 20 to 30 μm.

Figure 5:
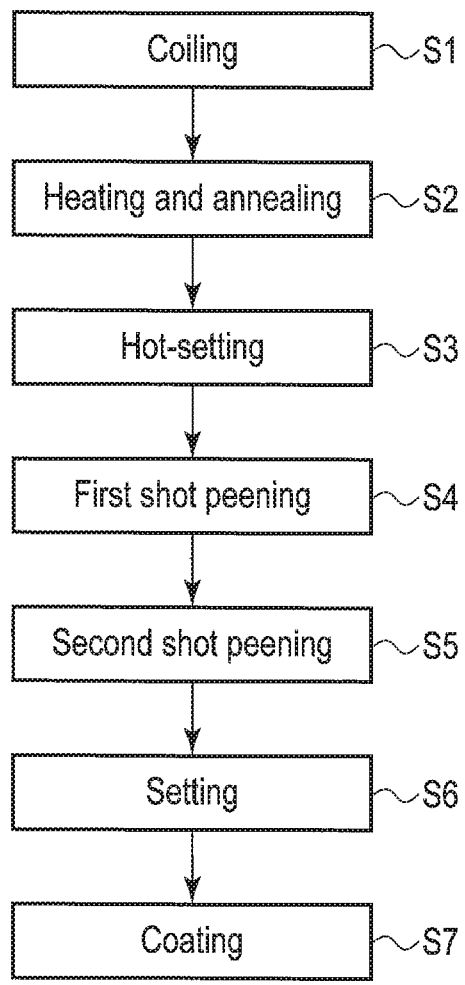
FIG. 5 shows an example of each process in a manufacturing process of the coil spring of FIG. 1.

FIG. 5 shows an example of a manufacturing process of the coil spring 10. In a forming process S1 of FIG. 5, the wire 11 is formed helically by a coiling machine. In a heat treatment process S2, tempering and annealing of the wire 11 are performed to remove a distortion stress produced in the wire 11 by the forming process S1. For example, in the heat treatment process S2, the wire 11 is heated to 400 to 450° C. and then is cooled slowly. In a hot setting process S3, hot setting is performed in a warm (250 to 350° C.) using a residual heat of the heat treatment process S2. In the hot setting, a load in the axial direction is applied to the coil spring 10 in the warm for a certain period by a pressure applying device.

Figure 6:
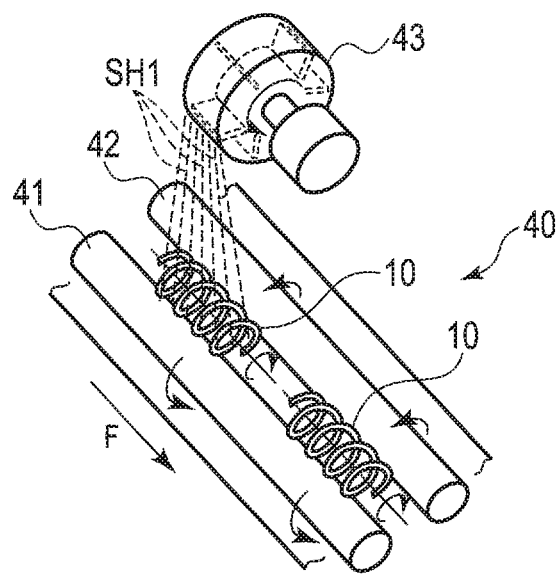
FIG. 6 is a perspective view schematically showing a continuous shot peening device.

Then, in a first shot peening process S4, first shot peening is performed in the warm. In the first shot peening process S4, first shots (for example, a large size cut wire of which grain diameter is 1.1 mm) are used. Note that the shot size may vary (for example, between 0.87 and 1.2 mm). The first shots are projected to the entire surface of the coil spring 10 in a process temperature of 250 to 300° C. by the continuous shot peening device 40 which is schematically shown in FIG. 6. The speed of projection of the first shots are, for example, 77 m/s.

FIG. 6 shows an example of the continuous shot peening device 40. The shot peening device 40 includes a pair of rotatable rollers 41 and 42 and a centrifugal accelerator (impeller) 43. The coil spring 10 disposed on the rollers 41 and 42 is rotated by the rollers 41 and 42 and continuously moves in the direction of arrow F in the figure. The centrifugal accelerator (impeller) 43 projects the first shots SH1 to the coil spring 10.

With the first shot peening, a compressive residual stress is produced to a relatively deep position from the surface of the coil spring 10. Furthermore, an oxide film (mill scale formed in the heat treatment) on the surface of the wire 11 is removed by the first shot peening. Furthermore, through the first shot peening, first shot peening indentations 20 (part of which is schematically shown in FIG. 4) are formed on the surface of the wire 11. Therefore, in a coating process S7, paint can be easily adhered to the surface of the wire 11 of the coil spring 10 which has been subjected to the first shot peening.

In a second shot peening process S5 of FIG. 5, second shot peening (warm stress shot peening) is performed in a temperature lower than that of the first shot peening process S4 (for example, 200 to 250° C.). The second shot peening is performed while the coil spring 10 is compressed by the vertical motion impeller-type shot peening device 50 shown in FIGS. 7 to 10. In the second shot peening process S5, second shots SH2 (for example, a small size cut wire of which grain diameter is 0.4 to 0.7 mm) is projected to the entire surface of the coil spring 10. The size of second shots SH2 are less than that of the first shots SH1 used in the first shot peening process S4.

Through the second shot peening process S5 (warm stress shot peening), the absolute value of the compressive residual stress in the proximity of the surface of wire 11 can be increased. Furthermore, the small size second shots SH2 are projected while the coil spring 10 is heated to the warm temperature range and is compressed. Therefore, the compressive residual stress in the proximity of the surface of coil spring 10 can be increased effectively and the surface roughness of wire 11 can be improved (the surface roughness can be decreased). Therefore, the durability of the coil spring 10 can further be increased.

After the second shot peening process S5, a setting process S6 is performed if necessary. Through the setting process S6, the length of the coil spring when no load is applied thereto (free length) is adjusted. In the setting process S6, the creep resistance of coil spring (sag resistance) can be improved. Note that the setting process S6 may be omitted. Then, in a coating process S7, a rust-proof paint is applied to the entirety of the coil spring by electrostatic coating or the like. Then, lastly, a quality inspection is performed and the coil spring 10 is completed.

Figure 7:
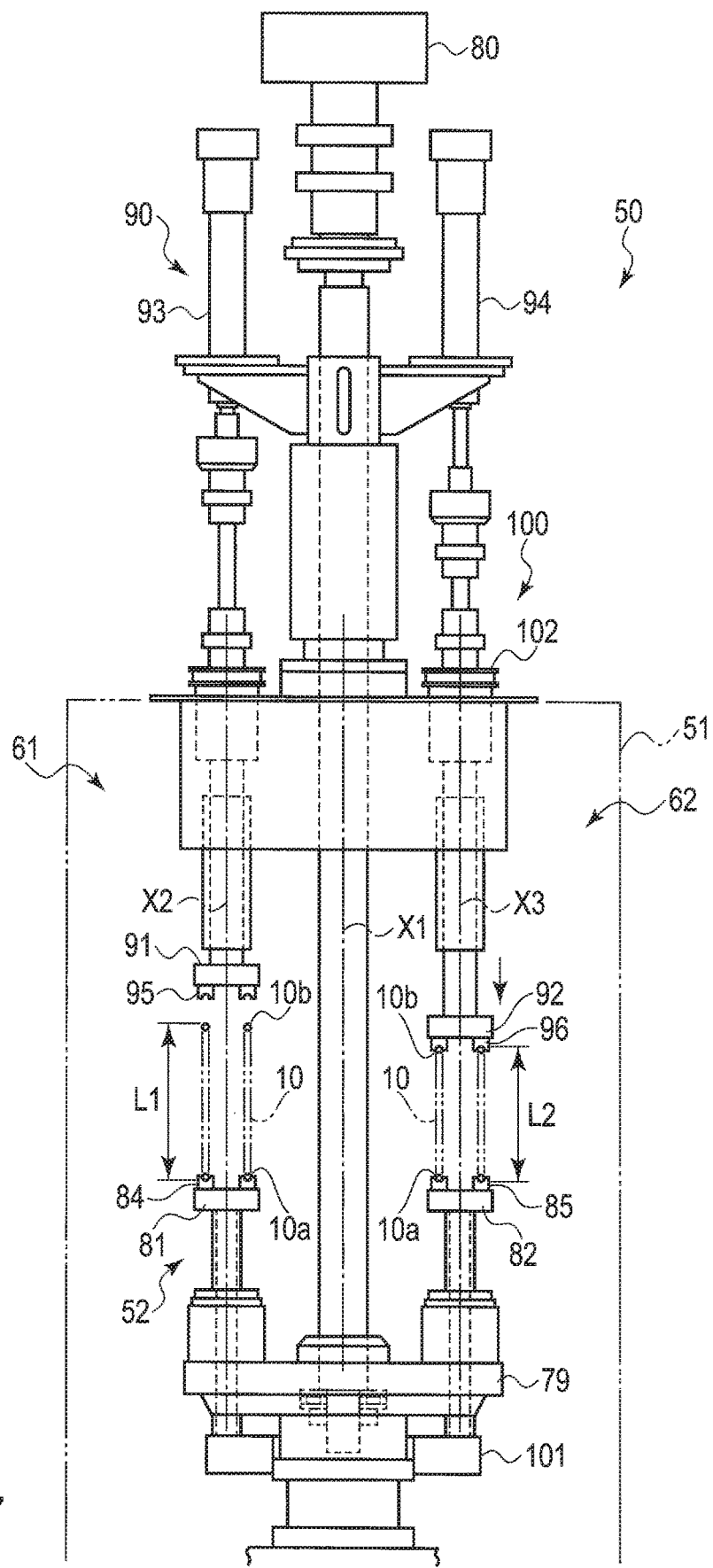
FIG. 7 is a front view showing a part of a vertical motion impeller-type shot peening device of an embodiment.
Figure 8:
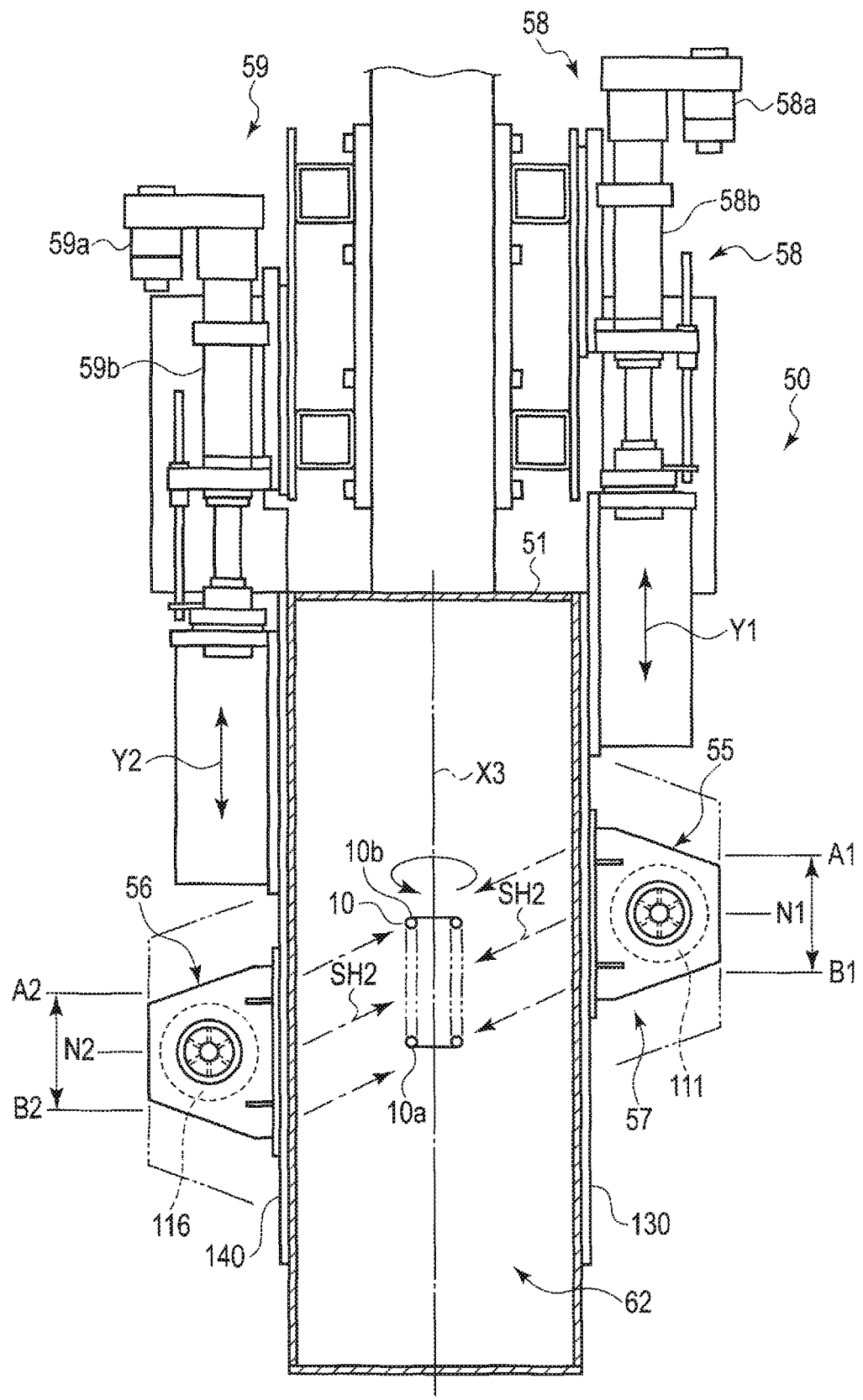
FIG. 8 is a vertical cross-sectional view of the vertical motion impeller-type shot peening device of FIG. 7.
Figure 9:
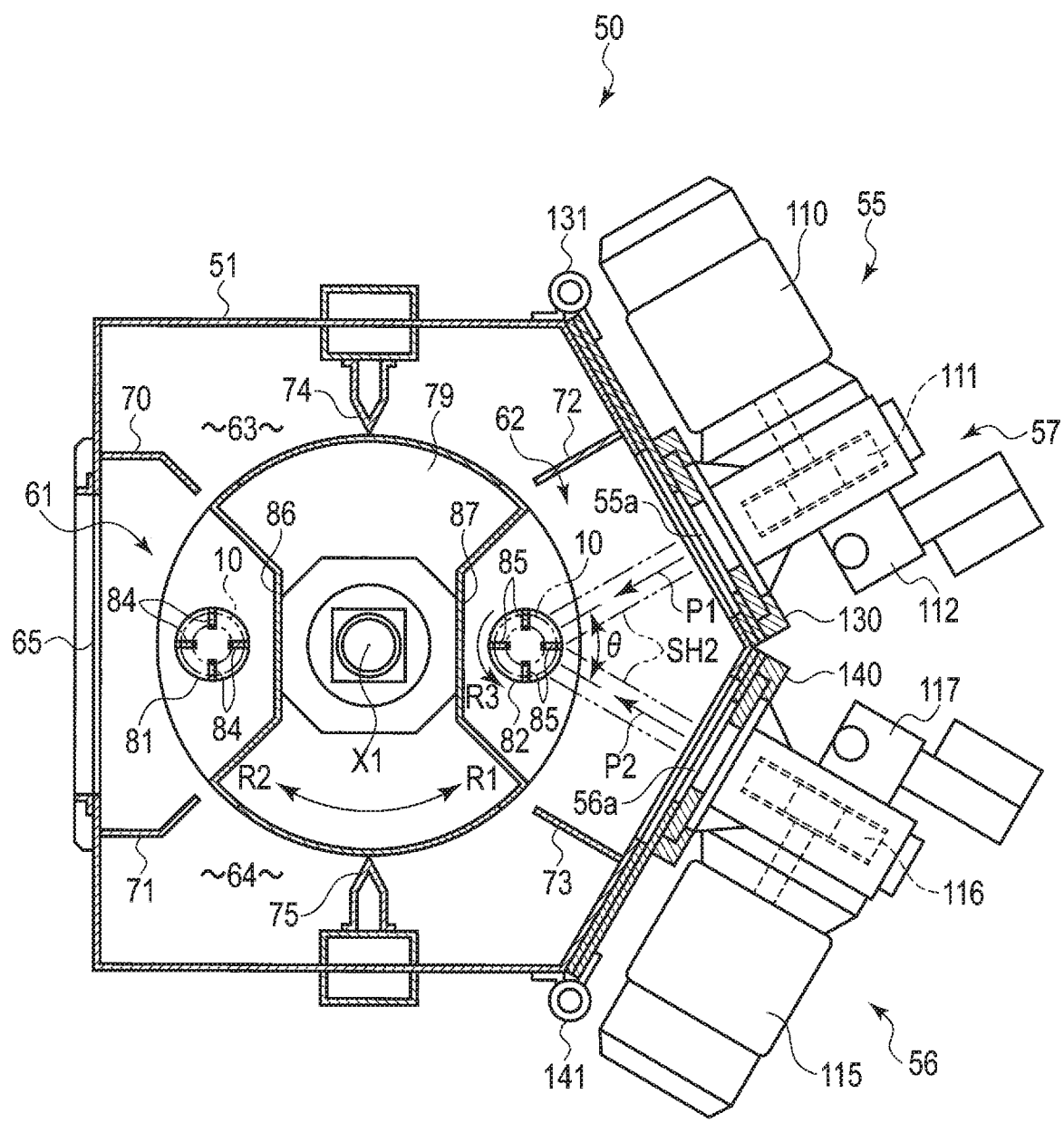
FIG. 9 is a horizontal cross-sectional view of the vertical motion impeller-type shot peening device of FIG. 7.
Figure 10:
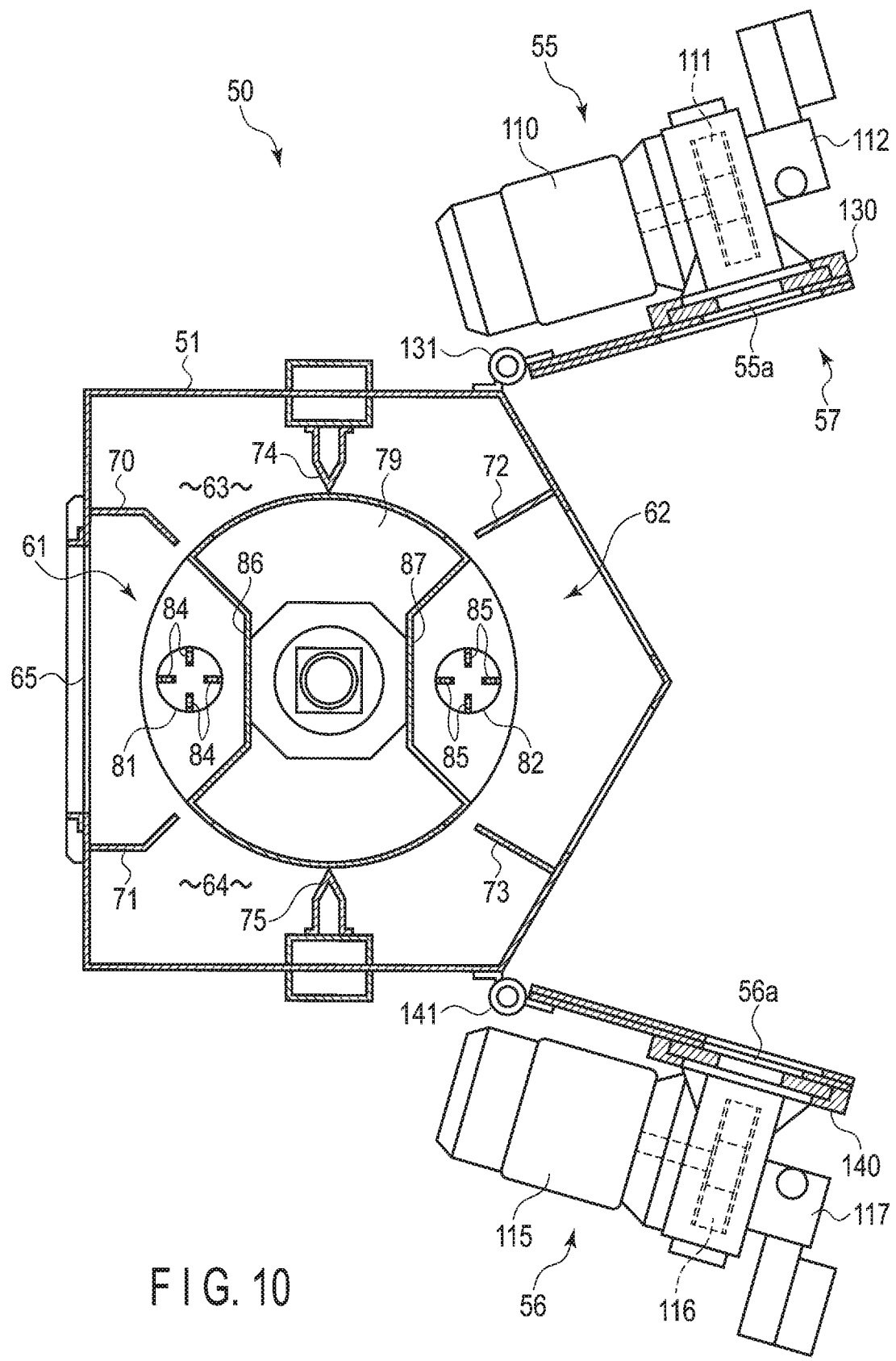
FIG. 10 is a horizontal cross-sectional view of the vertical motion impeller-type shot peening device of FIG. 7 in which an impeller unit is moved in an open position.

FIGS. 7 to 10 show the vertical motion impeller-type shot peening device 50. The vertical motion impeller-type shot peening device 50 is used in the second shot peening process S5. FIG. 7 is a front view showing a part of the vertical motion impeller-type shot peening device 50. FIG. 8 is a vertical cross-sectional view, and FIGS. 9 and 10 are horizontal cross-sectional views.

The vertical motion impeller-type shot peening device 50 includes a housing 51 in which the coil spring (workpiece) 10 is accommodated, workpiece holding mechanism 52, projection mechanism 57, first elevator mechanism 58, and second elevator mechanism 59. The workpiece holding mechanism 52 holds the coil spring 10 as standing substantially vertically. The projection mechanism 57 includes a first impeller unit 55 and a second impeller unit 56 which project shots SH2 to the coil spring 10. The first elevator mechanism 58 moves the first impeller unit 55 vertically. The second elevator mechanism 59 moves the second impeller unit 56 vertically.

For example, the first elevator mechanism 58 and the second elevator mechanism 59 include servo motors 58a and 59a (shown in FIG. 8) of which rotation is controlled by a controller and ball screws 58b and 59b rotated by the servo motors 58a and 59a. Based on the direction and amount of rotation of the servo motors 58a and 59a, the impeller units 55 and 56 independently move vertically at constant strokes Y1 and Y2, respectively.

As shown in FIGS. 8 and 9, a first chamber 61, second chamber 62, and middle chambers 63 and 64 which are disposed between the chambers 61 and 62 are formed inside the housing 51. A workpiece port 65 is formed in the first chamber 61. The workpiece port 65 is an aperture through which the coil spring 10 is put in and out the first chamber 61 from the outside the housing 51.

The second chamber 62 includes a projection port 55a of the first impeller unit 55 and a projection port 56a of the second impeller unit 56. With the first impeller unit 55 and the second impeller unit 56, the projection mechanism 57 is structured. Shot SH2 are projected to the coil spring 10 from the projection ports 55a and 56a. That is, the second shot peening is performed by projecting shots SH2 to the coil spring 10 in the second chamber 62.

As shown in FIGS. 9 and 10, partition walls 70 and 71 are provided between the first chamber 61 and the middle chambers 63 and 64. Partition walls 72 and 73 are provided between the second chamber 62 and the middle chambers 63 and 64. Seal walls 74 and 75 are formed in the middle chambers 63 and 64. The seal walls 74 and 75 keep the shots SH2 projected in the second chamber 62 from going to the first chamber 61.

As shown in FIG. 7, the workpiece holding mechanism 52 includes a turntable 79, motor-equipped revolution mechanism 80, and a pair of workpiece holders 81 and 82. The turntable 79 rotates around a revolution axis X1 extending in the vertical direction. The revolution mechanism 80 intermittently rotates the turntable 79, 180° at a time around the revolution axis X1 in either first direction R1 or second direction R2 (shown in FIG. 9). The workpiece holders 81 and 82 are disposed on the turntable 79.

The workpiece holders 81 and 82 each include lower end turn supports 84 and 85 contacting the lower end turn portion 10a of the coil spring 10. The workpiece holders 81 and 82 are positioned 180° symmetrically about the revolution axis X1. In the rear side of the workpiece holders 81 and 82, a pair of backup plates 86 and 87 are disposed. The backup plates 86 and 87 receive shots projected to the coil spring 10 in the second chamber 62.

For example, the lower end turn support 84 provided with the workpiece holder 81 includes a plurality of pawls (for example, four pawls). The pawls are disposed on the workpiece holder 81 in its peripheral direction at regular intervals. The pawls are formed in either a U-shape or an L-shape to support the end turn portion 10*a* inserted from the above. The lower end turn support 85 provided with the other workpiece holder 82 includes a plurality of pawls (for example, four pawls). The pawls are disposed on the workpiece holder 82 in its peripheral direction at regular intervals. As with the pawls of the workpiece holder 81, the pawls are formed in either a U-shape or an L-shape to support the end turn portion 10*a* inserted from the above.

The turntable 79 is rotated by the revolution mechanism 80 (shown in FIG. 7). The revolution mechanism 80, while placing the workpiece holder 81 in the center of the first chamber 61 (workpiece in-out position shown in FIG. 9), moves the other workpiece holder 82 in the center of the second chamber 62 (shot peening position). Furthermore, the revolution mechanism 80, while moving the workpiece holder 81 in the center of the second chamber 62 (shot peening position), places the other workpiece holder 82 in the center of the first chamber 61 (workpiece in-out position). That is, the revolution mechanism 80 intermittently rotates the turntable 79, 180° at a time around the revolution axis X1 in either first direction R1 or second direction R2 (shown in FIG. 9).

In the present embodiment, the workpiece holders 81 and 82 of the workpiece holding mechanism 52 are positioned on the turntable 79, 180° symmetrically. The pair of workpiece holders 81 and 82 include the lower end turn supports 84 and 85, respectively. The turntable 79 is intermittently rotated 180° at a time around the revolution axis X1 by the revolution mechanism 80. That is, the revolution mechanism 80 rotates the turntable 70 about the revolution axis X1 such that the lower end turn supports 84 and 85 reciprocate over the first chamber 61 and the second chamber 62.

Furthermore, the vertical motion impeller-type shot peening device 50 of the present embodiment includes a stress applying mechanism 90 and a rotation mechanism 100. The stress applying mechanism 90 compresses the coil spring 10 held by the workpiece holding mechanism 52. The rotation mechanism 100 allows the coil spring 10 held by the workpiece holding mechanism 52 to rotate around the vertical axes (rotation axes) X2 and X3.

The stress applying mechanism 90 includes presser members 91 and 92 and presser drivers 93 and 94 which are formed of, for example, a fluid cylinder. The presser members 91 and 92 are arranged just above the workpiece holders 81 and 82. The presser drivers 93 and 94 move the presser members 91 and 92 vertically, respectively. Upper end turn supports 95 and 96 are provided with the presser members 91 and 92. The upper end turn supports 95 and 96 contact the upper end turn portion 10*b* of the coil spring 10.

The upper end turn support 95 is provided with the presser member 91, and for example, the upper end turn support 95 includes a plurality of U-shaped or L-shaped pawls (for example, four pawls) which can support the end turn portion 10*b*. The pawls are disposed on the presser member 91 in its peripheral direction at regular intervals. The upper end turn support 96 is provided with the other presser member 92, and for example, the upper end turn support 96 includes a plurality of U-shaped or L-shaped pawls (for example, four pawls) which can support the end turn portion 10*b*. The pawls are disposed on the presser member 92 in its peripheral direction at regular intervals.

The presser drivers 93 and 94 move the presser members 91 and 92 vertically. The presser drivers 93 and 94 compress the coil spring 10 while placing the presser members 91 and 92 at the lower stroke end. Furthermore, the presser drivers 93 and 94 release the pressure to the coil spring 10 while placing the presser members 91 and 92 at the upper stroke end. That is, the presser drivers 93 and 94 are configured to move vertically in a stroke to both compress the coil spring 10 and to release the pressure to the coil spring 10.

The rotation mechanism 100 which rotates the coil spring 10 includes a lower rotator 101 and an upper rotator 102. The lower rotator 101 rotates the workpiece holders 81 and 82 around the vertical axes X2 and X3. The upper rotator 102 rotate the presser members 91 and 92 around the vertical axes X2 and X3. The lower rotator 101 and the upper rotator 102 rotate in synchronization in the same direction at the same revolution by the drivers and timing belts. The drivers are, for example, servo motors controlled by a control circuit.

The projection mechanism 57 projects shots SH2 to the coil spring 10. The projection mechanism 57 includes the first impeller unit 55 and the second impeller unit 56 which can move vertically. As shown in FIG. 8, the first impeller unit 55 projects shots SH2 to the coil spring 10 in the second chamber 62 from a diagonally upward position. Furthermore, the first impeller unit 55 moves vertically by the first elevator mechanism 58. The second impeller unit 56 projects shots SH2 to the coil spring 10 in the second chamber 62 from a diagonally downward position. Furthermore, the second impeller unit 56 moves vertically by the second elevator mechanism 59.

FIGS. 9 and 10 are horizontal cross-sectional views in which the first impeller unit 55 and the second impeller unit 56 viewed from the above. The first impeller unit 55 includes an impeller (wing wheel) 111 rotated by a motor 110 and a distributor 112 which supplies shots SH2 in the impeller 111. The second impeller unit 56 includes an impeller 116 rotated by a motor 115 and a distributor 117 which supplies shots SH2 in an impeller 116.

As shown in FIG. 9, as being viewed from the above, the coil spring 10 is disposed in the second chamber 62. Shots are projected to the coil spring 10 from each of the first impeller unit 55 and the second impeller unit 56. Lines P1 and P2 in FIG. 9 indicate shot projection directions toward the center of the coil spring 10. The first impeller unit 55 and the second impeller unit 56 are arranged such that lines P1 and P2 form an angle θ which is less than 180° (for example, 60°). Therefore, the first impeller unit 55 and the second impeller unit 56 can project shots SH2 to the coil spring 10 without interfering each other.

The first impeller unit 55 is supported such that it can move vertically along a vertical motion guide member 130 provided with the side of housing 51. The first impeller unit 55 reciprocates by the first elevator mechanism 58 from a neutral position N1 shown in FIG. 8 to go over an ascend position A1 and a descend position B1. The first elevator mechanism 58 includes, for example, drivers such as servo motor 58*a* and ball screw 58*b*.

Furthermore, the first impeller unit 55 can open/close about the first hinge mechanism 131 provided with the housing 51. That is, the first impeller unit 55 can rotate over a close position shown in FIG. 9 and an open position shown in FIG. 10. Then, the first impeller unit 55 is securely locked while the second chamber 62 is closed (the close position in FIG. 9). Furthermore, the first impeller unit 55 can be set in a state where the second chamber 62 is released (the open position in FIG. 10) for maintenance purpose or the like.

The second impeller unit 56 is supported such that it can move vertically by a vertical-motion guide member 140 provided with the side of housing 51. The second impeller unit 56 reciprocates by the first elevator mechanism 59 from a neutral position N2 shown in FIG. 8 to go over an ascend position A2 and a descend position B2. The second elevator mechanism 59 includes, for example, drivers such as servo motor 59*a* and ball screw 59*b*.

Furthermore, the second impeller unit 56 can open/close about the second hinge mechanism 141 provided with the housing 51. That is, the second impeller unit 56 can rotate over a close position shown in FIG. 9 and an open position shown in FIG. 10. Then, the second impeller unit 56 is securely locked while the second chamber 62 is closed (the close position in FIG. 9). Furthermore, the second impeller unit 56 can be set in a state where the second chamber 62 is released (the open position in FIG. 10) for maintenance purpose or the like.

As shown in FIG. 10, the first impeller unit 55 and second impeller unit 56 are moved to the open positions around the hinge mechanism 131 and 141, respectively. In this state, the second chamber 62 is released and the inside of second chamber 62 can be seen from the outside of housing 51. At the same time, the inside of first impeller unit 55 and the inside of second impeller unit 56 can be seen through the projection ports 55*a* and 56*a*. Therefore, the maintenance of the second chamber 62 and the impeller units 55 and 56 can be performed.

Now, the second shot peening process S5 (as shown in FIG. 5) performed with the vertical motion impeller-type shot peening device 50 of the present embodiment will be explained.

Initially, a first coil spring 10 is disposed on the workpiece holder 81 in the first chamber 61. The coil spring 10 drawn in the left of FIG. 7 is in a state where a compression load is not applied (free state) and the length of coil spring 10 (free length) is L1. On the entire surface of coil spring 10, first shot peening indentations 20 are formed preliminarily through the first shot peening process S4 (shown in FIG. 5).

The workpiece holder 81 is stopped in the workpiece in-out position in the first chamber 61. The coil spring 10 is disposed on an end turn support 84 of the workpiece holder 81. Then, the presser member 91 is lowered to the lower stroke end. In that state, the coil spring 10 is compressed to a length L2 between the lower end turn support 84 and the upper end turn support 95. Thereby, a torsional stress is applied to the coil spring 10. Then, the turn table 79 rotates 180°, the coil spring 10 is conveyed in the shot peening position of the second chamber 62 together with the workpiece holder 81. At the same time, the other workpiece holder 82 is moved to the first chamber 61. Therefore, in the first chamber 61, a second coil spring 10 can be disposed on the workpiece holder 82.

In the second chamber 62, the compressed coil spring 10 is rotated by the rotation mechanism 100. The second shot peening is performed to the rotating coil spring 10 by the first impeller unit 55 and the second impeller unit 56 which move vertically. In the second shot peening, the first impeller unit 55 and the second impeller unit 56 move vertically in synchronization. Since the compressed coil spring 10 rotates, the second shots SH2 are projected to the entire surface of wire 11 including the end turn portions 10*a* and 10*b* and the effective portion 10*c*. By performing the second shot peening with the stress applied, the compressive residual stress can increase in the proximity of the surface of coil spring 12.

In the present embodiment, the second shot peening is performed while the coil spring 10 is compressed. That is, the shots SH2 are projected while gaps between adjacent pairs of turn portions of the wire become less than that in the free state. Therefore, if the shots SH2 are projected from a single direction, the shots may miss a part of the coil spring 10. In consideration of this point, a pair of the impeller units 55 and 56 each move vertically, the coil spring 10 rotates, and the shots SH2 are projected to the coil spring 10 from both diagonally upward and downward positions. Therefore, shots can sufficiently hit the entirety of the coil spring 10.

In the second shot peening, the second shots SH2 are projected over the first shot peening indentations by the vertical motion impeller-type shot peening device 50. Therefore, the second shots SH2 hit the surface of wire 11 except for the positions contacting the end turn supports 84, 85, 95, and 96. Thereby, the second rough surface 31 is formed on the surface of wire 11 except for the positions contacting the end turn supports 84, 85, 95, and 96. The second rough surface 31 includes a large number of second shot peening indentations 30 of which surface roughness is less than that of the first shot peening indentations 20 (shown in FIGS. 3 and 4). The second shots SH2 do not hit the positions contacting the end turn supports 84, 85, 95, and 96. Therefore, the first rough surface 21 including the first shot peening indentations 20 is scattered on a part of the end turn portions 10*a* and 10*b*.

After the second shot peening is performed in the second chamber 62, the turntable 79 rotates 180°. Thereby, the coil spring 10 on the workpiece holder 81 returns to the first chamber 61 from the second chamber 62. At the same time, a second coil spring 10 held by the other workpiece holder 82 is conveyed in the second chamber 62.

When the coil spring 10 on the workpiece holder 81 returns to the first chamber 61 from the second chamber 62, the presser member 91 moves up. The coil spring 10 is extracted to the outside of first chamber 61 from the workpiece port 65. The second coil spring 10 is conveyed from the first chamber 61 to the second chamber 62. The second coil spring 10 is, as with the first coil spring 10, subjected to the second shot peening by the first impeller unit 55 and the second impeller unit 56 in the second chamber 62.

Here, hypothetically, there is some failure in the manufacturing process of the coil spring of FIG. 5, and the first shot peening process S4 or the second shot peening process S5 is not performed. In that case, the entire surface of coil spring 10 only includes the shot peening indentations of the same surface roughness and first rough surfaces 21 scattered in an island shape are not formed. Therefore, as to the coil spring 10 before the coating, whether or not both the first shot peening and the second shot peening are performed can be checked by seeing the first rough surfaces 21 scattered in an island shape are formed on the end turn portions 10*a* and 10*b*. That is, whether or not two kinds of shot peenings have been performed can be checked. After the coating of the coil spring, whether or not there is a first rough surface 21 is checked by peeling off either one of the end turn portions 10*a* and 10*b*.

The first rough surface 21 only includes the first shot peening indentations 20. Therefore, the increase of residual stress obtained by the second shot peening indentations 30 cannot be expected in the first rough surface 21. However, the first rough surfaces 21 are scattered in an island shape on the end turn portions 10*a* and 10*b* which can hold much stress. Therefore, even if there are first rough surfaces 21 remaining on a part of the coil spring 10, the durability of coil spring 10 is not harmed thereby.

The vertical motion impeller-type shot peening device 50 of the present embodiment includes the first chamber 61 and the second chamber 62. The turntable 79 intermittently rotates 180° at a time and a pair of workpiece holders 81 and 82 are alternatively conveyed in the first chamber 61 and the second chamber 62. Therefore, while an operator handles the coil spring 10 in the first chamber 61, shot peening is performed in the second chamber 62. Therefore, the second shot peening process S5 can be performed efficiently to a plurality of coil springs 10.

The vertical motion impeller-type shot peening device of the present application can be applied to a coil spring other than suspension coil spring. Furthermore, to achieve the present invention, various models, structures, and arrangements of elements used in the vertical motion impeller-type shot peening device such as specific shapes and structures of the housing, workpiece holding mechanism, stress applying mechanism, rotation mechanism, projection mechanism, and elevator mechanism can be changed arbitrarily. For example, there may be only one workpiece holder including lower end turn supports or may be three or more workpiece holders. Furthermore, the coil spring of the present embodiment can be used various purposes other than the vehicle suspension device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims.

What is claimed is:

1. A coil spring comprising a helically formed wire and having end turn portions at ends thereof, the coil spring comprising:
    a plurality of first rough surfaces, each including first shot peening indentations formed on a part of a surface of the end turn portions; and
    a second rough surface including second shot peening indentations formed on the entire surface of the wire except for the first rough surface, the second rough surface having a surface roughness different from that of the first rough surface.

2. The coil spring of claim 1, wherein the surface roughness of the second rough surface is less than that of the first rough surface.

3. The coil spring of claim 1, wherein the first rough surfaces are scattered at intervals on the end turn portions in a winding direction.

4. The coil spring of claim 3, wherein the first rough surfaces on a lower end turn portion are formed on a lower surface of the lower end turn portion in a state where the coil spring is standing substantially vertically.

5. The coil spring of claim 4, wherein the first rough surfaces on an upper end turn portion are formed on an upper surface of the upper end turn portion in a state where the coil spring is standing substantially vertically.

\* \* \* \* \*